United States Patent
Agrawal

(10) Patent No.: US 8,635,442 B2
(45) Date of Patent: Jan. 21, 2014

(54) SYSTEM AND METHOD FOR LONG-TERM DIGITAL SIGNATURE VERIFICATION UTILIZING LIGHT WEIGHT DIGITAL SIGNATURES

(75) Inventor: Sunil C. Agrawal, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 714 days.

(21) Appl. No.: 12/431,608

(22) Filed: Apr. 28, 2009

(65) Prior Publication Data

US 2013/0132718 A1    May 23, 2013

(51) Int. Cl.
*H04L 9/00* (2006.01)
(52) U.S. Cl.
USPC ............ 713/155; 713/156; 713/158; 713/176
(58) Field of Classification Search
USPC .......... 713/155–158, 168, 173, 176; 726/1, 2, 726/10
See application file for complete search history.

(56) References Cited

U.S. PATENT DOCUMENTS

| | | | |
|---|---|---|---|
| 5,005,200 A | | 4/1991 | Fischer |
| 5,659,616 A | * | 8/1997 | Sudia .............................. 705/76 |
| 6,044,462 A | * | 3/2000 | Zubeldia et al. .............. 713/158 |
| 6,324,645 B1 | * | 11/2001 | Andrews et al. .............. 713/157 |
| 6,550,011 B1 | | 4/2003 | Sims, III |
| 6,584,565 B1 | * | 6/2003 | Zamek .......................... 713/156 |
| 7,966,487 B2 | * | 6/2011 | Engberg et al. ............... 713/156 |
| 8,024,561 B1 | * | 9/2011 | Das et al. ....................... 713/156 |
| 2006/0200661 A1 | * | 9/2006 | Doonan et al. ................ 713/156 |
| 2008/0098232 A1 | * | 4/2008 | Miyazaki et al. ............. 713/176 |
| 2009/0235071 A1 | * | 9/2009 | Bellur et al. .................. 713/158 |
| 2011/0072270 A1 | * | 3/2011 | Little et al. .................... 713/175 |

OTHER PUBLICATIONS

Petra Wohlmacher. 2000. Digital certificates: a survey of revocation methods. In Proceedings of the 2000 ACM workshops on Multimedia (Multimedia '00). ACM, New York, NY, USA, 111-114.*
S. Chokhani and C. Wallace. Trusted archiving. In Proceedings of the 3rd Annual PKI R&D Workshop. NIST, Apr. 2004.*
Carmela Troncoso, Danny De Cock, and Bart Preneel. 2008. Improving secure long-term archival of digitally signed documents. In Proceedings of the 4th ACM international workshop on Storage security and survivability (StorageSS '08). ACM, New York, NY, USA, 27-36.*
D. Pinkas, et al., CMS Advanced Electronic Signatures (CAdES), Network Working Group, 2008.

* cited by examiner

*Primary Examiner* — Hosuk Song
(74) *Attorney, Agent, or Firm* — Wolfe-SBMC

(57) ABSTRACT

Various embodiments of a system and method for long-term digital signature verification utilizing light weight digital signatures are described. Embodiments may include a verifying entity system that receives digitally signed data including a portion of data, signing time, and digital signature. The verifying entity system may receive a digital certificate that includes information for verifying the digital signature and an expiration time for the certificate. The verifying entity system may receive CRL that persists revocation information corresponding to ones of the revoked digital certificates that have already expired. The verifying entity system may utilize the CRL to determine that the digital signature is valid subsequent to its expiration time. The verifying entity system may evaluate the CRL to determine that the digital certificate was not revoked at the signing time. The verifying entity system may determine the digital signature is a valid digital signature and generate a corresponding result.

31 Claims, 6 Drawing Sheets

SYSTEM AND METHOD FOR LONG-TERM DIGITAL SIGNATURE VERIFICATION UTILIZING LIGHT WEIGHT DIGITAL SIGNATURES

BACKGROUND

1. Field of the Invention

The present invention is directed to computer systems. More particularly, it is directed to verifying digital signatures within a computing environment.

2. Description of the Related Art

The Internet, sometimes called simply "the Net," is a worldwide system of computer networks in which a client at any one computer may, with permission, obtain information from any other computer. The most widely used part of the Internet is the World Wide Web, often abbreviated "WWW," which is commonly referred to as "the web." The web may be defined as all the resources (e.g., web pages and web sites) and users on the Internet that use the Hypertext Transfer Protocol (HTTP) or variations thereof to access the resources. A web site is a related collection of web files that includes a beginning file called a home page. From the home page, the user may navigate to other web pages on the web site. A web server program is a program that, using the client/server model and HTTP, serves the files that form the web pages of a web site to the web users, whose computers contain HTTP client programs (e.g., web browsers) that forward requests and display responses. A web server program may host one or more web sites.

In recent years the ubiquity of the Internet and the World Wide Web has paved the way for the electronic exchange of information. For instance, activities that were previously performed in person are now in many cases performed over the Internet. One example includes electronic signing of documents or other data. For example, instead of traveling to a bank to complete and sign an application for a loan, an individual might visit the website of a financial institution, complete and electronically sign an electronic version of the loan application, and transmit the completed and signed application to the financial institution via the Internet.

In some cases, electronically signing a document (or other data) may indicate that a user agrees to terms or other stipulations set forth by the document. In other words, an electronic signature can be used as a substitute for a physical signature (e.g., a substitute for a handwritten depiction of a user's name that the user can write on documents as a proof of identity, intent, and/or acknowledgement). Electronic signatures can exist in many forms. For instance, an electronic license agreement might ask a user to confirm that he or she has read the agreement by instructing the user to electronically sign a form by entering or typing his or her name into a web-based form or, alternatively, entering some other information (e.g., a numerical code) into such a form. Various more advanced types of electronic signatures can also be utilized. For instance, one particular type of electronic signature includes an encrypted digital signature (or simply "digital signature"). Digital signatures may in some cases be more secure than other electronic signatures since digital signatures are typically created with a private key known only to the signing entity (and/or one or more trusted third parties).

To prevent repudiation of a valid electronic signature, it may be useful to be able to verify the authenticity of an electronic signature. For instance, electronic signatures may in some cases be used to sign a legally binding document, such as a contract between two or more parties (e.g., the signer and one or more other parties). In the event that a particular party does not fulfill one or more terms set forth by such a contract, one or more other parties bound by the contract can utilize electronic signature verification techniques to prove that the particular party did indeed electronically sign the contract. Such verification techniques may prove useful for recouping damages from the party that broke the contract.

SUMMARY

Various embodiments of a system and method for long-term digital signature verification utilizing light weight digital signatures are described. Various embodiments may include a verifying entity system configured to receive digitally signed data that includes a particular portion of data, data indicating a signing time at which the particular portion of data was digitally signed, and a digital signature of the particular portion of data and of the data indicating the signing time. The verifying entity system may also be configured to receive a first digital certificate that includes information for verifying the digital signature of the digitally signed data and information indicating an expiration time at which the first digital certificate expires.

The verifying entity system may also be configured to receive a certificate revocation list (CRL) that includes revocation information indicating multiple revoked digital certificates. The CRL may persist the revocation information corresponding to ones of the revoked digital certificates that have already expired.

The verifying entity system may be configured to utilize the CRL to determine that the digital signature is valid subsequent to the expiration time of the first digital certificate. For instance, the verifying entity system may be configured to evaluate the CRL to determine that the first digital certificate was not revoked at the signing time. In response to that evaluation, the verifying entity system may be configured to determine that the digital signature is a valid digital signature of the particular portion of data according to the digital certificate. The verifying entity system may also be configured to generate a result indicating that the digital signature is valid.

Figure 1:
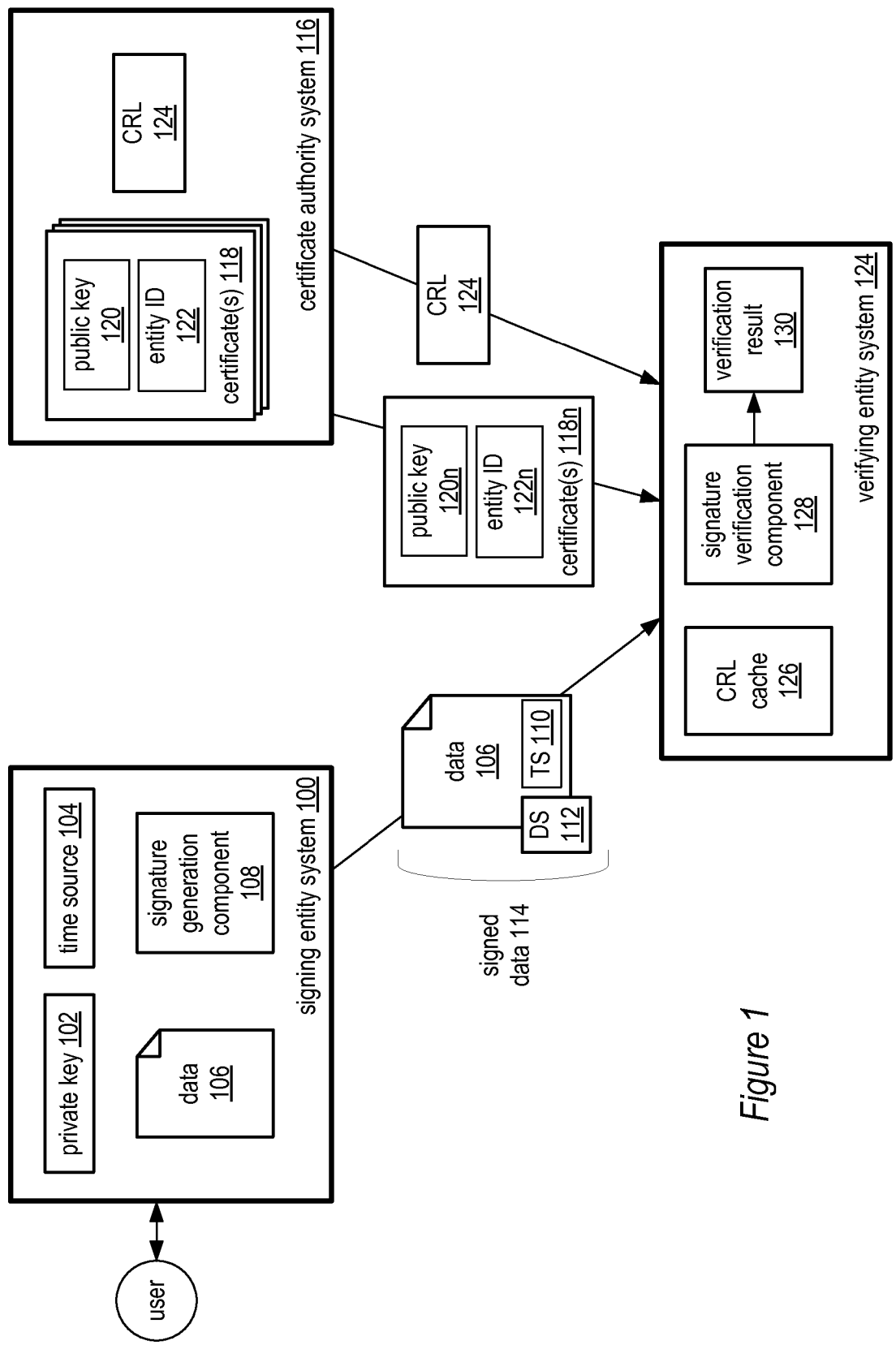
FIG. 1 illustrates a logical representation of the various components of the system for long-term digital signature verification utilizing light weight digital signatures, according to various embodiments.

While the system and method for long-term digital signature verification utilizing light weight digital signatures is described herein by way of example for several embodiments and illustrative drawings, those skilled in the art will recognize that the system and method for long-term digital signature verification utilizing light weight digital signatures is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for long-term digital signature verification utilizing light weight digital signatures as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. In various portions of the description presented herein, the terms "validate", "verify", "validation", "verification", "validating", and "verifying" may be used interchangeably.

DETAILED DESCRIPTION OF EMBODIMENTS

Various embodiments of a system and method for long-term digital signature verification utilizing light weight digital signatures are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction

FIG. 1 illustrates a logical representation of various components in one embodiment of the system and method for long-term digital signature verification utilizing light weight digital signatures. In some embodiments, signing entity system 100, certificate authority system 116, and verifying entity system 124 may represent respective components of a public key infrastructure (PKI). In other embodiments, other key infrastructures, whether presently known or developed in the future may be utilized. As described in more detail below, the illustrated embodiment demonstrates the signing of data by a signing entity, the transmission of a digitally signed version of such data to a verifying entity (sometimes referred to as a relying entity), and the verification of a digitally signed data by the verifying entity. Note that any of the systems illustrated in FIG. 1 may be implemented by one or more host systems, including but not limited to the host system illustrated in FIG. 6. In various embodiments, the data to be signed and later verified may represent data upon which long-term signature verification may be pertinent. For example, data 106 may represent a loan application (e.g., a 30-year mortgage) for which signature verification may be pertinent over the entire life of the corresponding loan. Other examples of such data are described in more detail below.

Generation of the Digital Signature

Signing entity system 100 may include a signature generation component 108 configured to generate a digital signature of data, including data 106. Data 106 may include any data that can be stored on a memory medium including but not limited to electronic representations of text and/or graphics, which may include but is not limited to data files adhering to the following formats: a word processor format, the Portable Document Format (.PDF), Electronic Publication (.EPUB) format created by the International Digital Publishing Forum (IDPF), JPEG (.JPG) format, Portable Network Graphics (.PNG) format, Adobe Photoshop (.PSD) format or some other format for electronically storing text, graphics and/or other information whether such format is presently known or developed in the future. In various embodiments, data 106 may include electronic representations of music or other audio, which may include but is not limited to data files adhering to the Adobe Sound Document (.ASND) format or some other format configured to store electronic audio whether such format is presently known or developed in the future. In various embodiments, data 106 may include electronic representations of videos, movies, or other multimedia, which may include but is not limited to data files adhering to Adobe Flash Video (.FLV) format or some other video file format whether such format is presently known or developed in the future. In some embodiments, data may include any combination of the above-described examples.

The signature generation component 108 may be configured to digitally sign data 106 with private key 102. Prior to signing, signature generation component 106 may append a time stamp or other temporal indication to data 106. Such timestamp may in some embodiments be generated by time source 104, which may in some embodiments be a system clock or other clock configured to indicate an accurate representation of the current time. In various embodiments, the time stamp appended to data 106 may indicate the time at which signature generation component 108 digitally signs data 106. In other embodiments, the timestamp may indicate a time that is close to but not exactly the same as the time at which signature generation component 108 digitally signs data 106. For instance, the timestamp may indicate a time that is within a specified tolerance or range with respect to the actual time at which the signature generation component 108 digitally signs data 106. One example of a timestamp generated as described above is illustrated within FIG. 1 as timestamp 110 (or TS 110). Note that appending timestamp 110 to data 106 may include storing timestamp 110 within data 106 (e.g., as metadata of data 106). In other cases, appending timestamp 110 to data 106 may include concatenating or otherwise combining timestamp 110 and data 106. In one embodiment, appending timestamp 110 to data 106 may include designating that timestamp 110 and data 106 are to be digitally signed together by the same instance of a digital signature process.

Note that in various embodiments, the nature of the system may ensure that time source 104 (and/or any time sources of systems 124 and 116, not illustrated) are secure or trusted time sources. For example, in one embodiment, signing entity system 100 may be subject to user privileges that prevent the tampering of time source 104 by users that have not been granted certain privileges (e.g., administrative privileges). For instance, in some embodiments, time source 104 may be a system clock of signing entity system 100. In some embodiments, such system clock can only be altered by an administrator with appropriate privileges for modifying the system time. In other embodiments time source 104 may be secured in some other manner such that signing entity system 100, certificate authority system 116 and verifying entity system 124 trust the timestamps produced by time source 104. By utilizing a secure time source 104, the illustrated may in some embodiments avoid using a Time Stamping Authority (TSA) (i.e., a trusted third party that may create time-stamp tokens in order to indicate that a datum existed at a particular point in time). By not utilizing a TSA, the illustrated system may avoid trust issues associated with reliance on a TSA. For instance, in some cases, a TSA can be discretely compromised by an attacker such that the TSA does not provide correct timestamps. By not utilizing a TSA, the illustrated system may avoid exposure to such an attack. In some cases, the use of a TSA requires timestamped data to be re-timestamped at regular intervals or at other designated times. By not utilizing a TSA, the illustrated system may avoid utilizing resources on re-timestamping data. Note that the description of these embodiments is not intended to be limiting in nature. Indeed, in various other embodiments, the system may be configured to utilize a TSA instead of a secure time source or in conjunction with a secure time source.

In various embodiments, the illustrated private key 102 may be a secret key that is known only to signing entity system 100. In some embodiments, one or more trusted parties may also have knowledge of private key 102 (e.g., certificate authority system 116). In various embodiments, any trusted third party system that has access to the private key may be configured to protect the secrecy of the private key such that an attacker cannot obtain knowledge of the private key. Private key 102 may be generated by a key derivation function that generates a private key—public key pair. In the illustrated embodiment, a key derivation function may be utilized to generate private key 102 and public key 120 as a private key—public key pair. In various embodiments, either or both of signing entity system 100 and certificate authority system 116 may be configured to perform the aforesaid key derivation function to generate private key 102 and public key 120 as a private key—public key pair. If the certificate authority system 116 performs the key derivation function, private key 102 may be delivered to signing entity system 100 via an encrypted communication channel. In various embodiments, such an encrypted communication channel may prevent an attacker or other unscrupulous entity from obtaining private key 102. In some embodiments, if certificate authority system 116 generates the private key—public key pair, the certificate authority may be configured to delete or destroy all knowledge or data pertaining to the private key 102. In some cases, such deletion may be performed in response to receiving an acknowledgement message from signing entity system 100 that indicates the signing entity has successfully received the private key.

In the illustrated embodiment, the digitally signed data generated by signature generation component 108 is illustrated as signed data 114. Signed data 114 may include data 106, timestamp 110, and digital signature 112 (or DS 112) (which may be generated by the signature generation component). In various embodiments, signature generation component 108 may create digital signature 112 according to any known digital signature generation techniques, including but not limited to those utilized by PKI. In one embodiment, the signature generation component 108 may be configured to generate signed data 114 according to the data flow diagram illustrated in FIG. 2.

Figure 2:
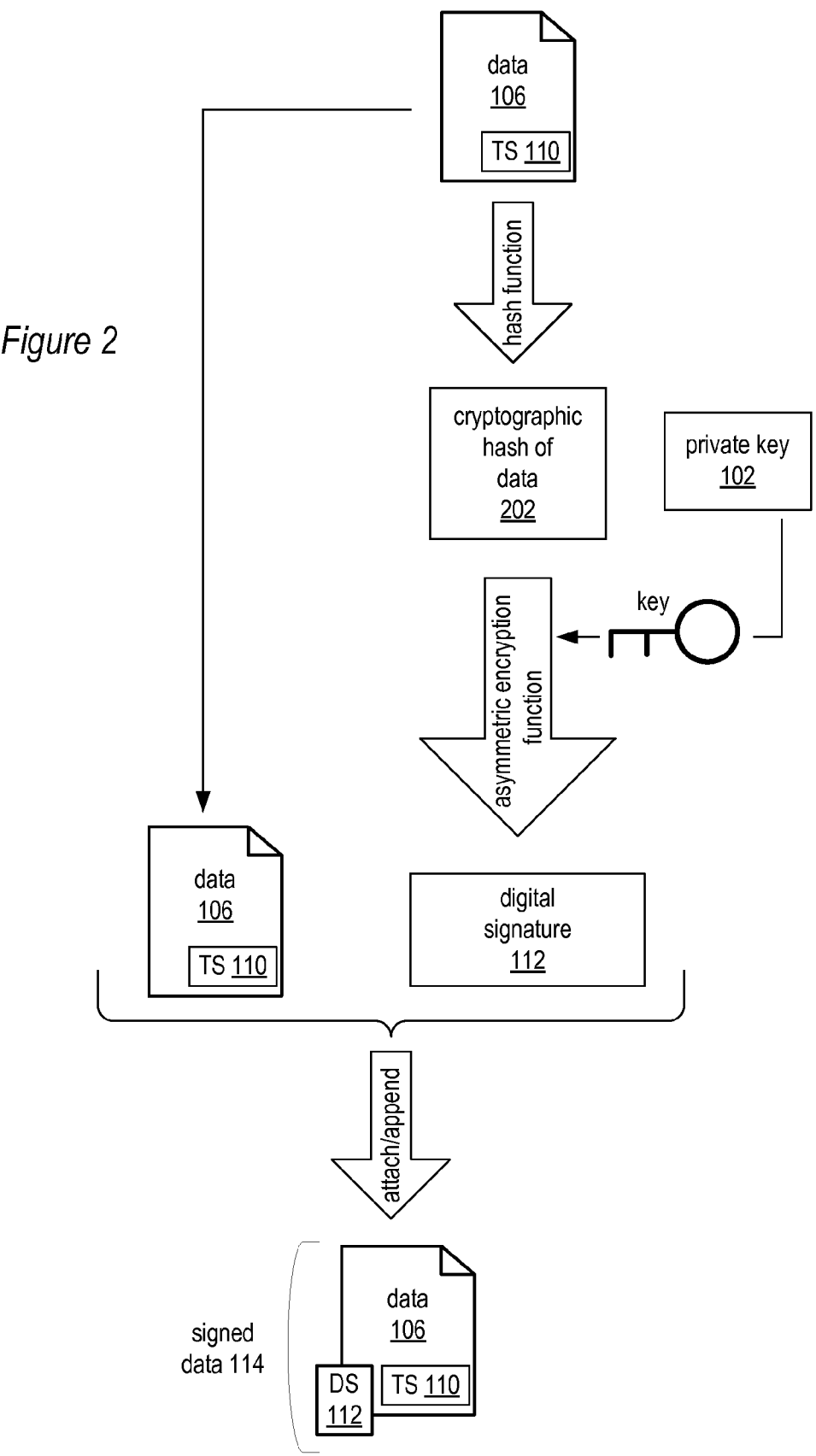
FIG. 2 illustrates a data flow diagram of a process for generating digitally signed data, according to various embodiments.

As illustrated in FIG. 2, the signature generation component 108 may be configured to perform a cryptographic hash function (e.g., SHA-1) on data 106 which includes an appended timestamp 110 as described above. The result of such operation is illustrated as cryptographic hash of data 202. The signature generation component 108 may be configured perform an asymmetric encryption function on hash 202 to generate a digital signature. In various embodiments, performing an asymmetric encryption function on hash 202 may include encrypting hash 202 with a private key 102, which may be the private key that the signing entity system may hold or protect as a secret as described above. The result of this encryption process is digital signature 112, which may be validated with a public key that forms a private key—public key pair with private key 102 (as described above, the private key and public key may be generated as a pair by a key derivation function performed by the signing entity system or the certificate authority system). Signature generation component 108 may be configured to provide such public key to other host systems within a digital certificate, such as an X.509 certificate in Public Key Infrastructure (PKI) systems. Such digital certificates may also be distributed by certificate authority system 116 or another trusted third party that can verify the public key is a valid public key of the signing entity or an entity controlling the signing entity system 100 (such as the illustrated user). As demonstrated by the illustrated embodiment, the signature generation component may be configured to attach or append the generated digital signature 112 to data 106 (e.g., by attaching the digital signature as metadata). Returning to FIG. 1, the signing entity system may be configured to provide the signed data 114 to verifying entity system 124. For instance, such communication may be performed over one or more networks, such as the network described below with respect to FIG. 5. In other embodiments, the signing entity system 100 may be configured to provide signed data 114 to one or more intermediary systems (e.g., computer systems, data stores, etc.). In such embodiments, verifying entity system 124 may be configured to receive signed data 114 from such intermediary systems.

Note that the description present above provides SHA-1 as an example of a cryptographic hash function. In various other embodiments, other cryptographic hash functions may be utilized by the system described herein. For example, the hash functions described herein may be any of various hash functions including, but not limited to, the Secure Hash Algorithm (SHA) (e.g., SHA-1, SHA-0, SHA-224, SHA-256, SHA-384, SHA-512, and other SHA variations), the RACE Integrity Primitives Evaluation Message Digest (RIPEMD) (e.g., RIPEMD-128, RIPMED-160, RIPEMD-256, RIPEMD-320, and other RIPEMD variations), the Message Digest algorithm (MD) (e.g., MD-3, MD-4, MD-5, and other MD variations), the Tiger and Tiger2 hash functions (e.g., Tiger-128, Tiger-160, Tiger-192, Tiger2-128, Tiger2-160, Tiger2-192, and other Tiger variations), the Very Efficient Substitution Transposition (VEST) (e.g., VEST-4, VEST-8, VEST-16, VEST-32, and other VEST variations), the WHIRLPOOL hash function, some other hash function whether presently known or developed in the future, and/or some combination or variation of any of the aforesaid hash functions.

The Certificate Authority

In various embodiments, certificate authority system 116 may be configured to control the generation, storage, and/or maintenance of one or more certificates 118. A given one of certificates 118 may indicate (or certify) that the respective public key 120 of the certificate forms a public key—private key pair with a private key held by the entity identified by the respective entity identifier 122 (illustrated as entity ID 122). For example, the certificate may indicate (or certify) that the respective public key 120 of the certificate may be utilized to correctly decrypt data or information encrypted by the corresponding private key (of the public key—private key pair) held by the entity identified by respective entity identifier 122 of the same certificate. When generated in this manner, a given certificate 118 may effectively certify that the public key is tied to the entity identified by the certificate. Note that in various embodiments a given signing entity may utilize multiple different private keys. Accordingly, in some embodiments, multiple corresponding certificates may collectively tie multiple different public keys to the same entity.

As described above, a key pair including private key 102 and a corresponding public key 120 may be generated by a key derivation function that generates a private key—public key pair. In various embodiments, either or both of signing entity system 100 and certificate authority system 116 may be configured to perform the aforesaid key derivation function to generate private key 102 and public key 120 as a private key—public key pair.

Since creating a given certificate 118 that includes a given public key 120 and entity identifier 122 effectively certifies that the given public key corresponds to a private key utilized by the entity identified by the entity identifier, the certificate authority system 116 may be configured to authenticate such entity. For instance, to authenticate an entity, the certificate authority system (or an entity controlling such system) may engage such entity in a registration process. Such registration process may in some cases require the entity to provide authentication information including but not limited to usernames, passwords, personal information (address, mother's maiden name, etc.), identification documents (license, social security card, passport, etc.), other entity identifiers (e.g., an Employer Identification Number or "EIN"), and/or other information for identifying an entity (e.g., fingerprints, retinal scans, deoxyribonucleic acid or "DNA"). In some cases, the certificate authority may be configured to compare information collected in such a registration process and compare such information to known information for the registering entity in order to determine whether the entity is to be authenticated. In various other embodiments, the above described authentication process may be performed by a separate registration authority and/or a system under the control of such an authority (not illustrated).

In various embodiments, certificate authority system 116 may be configured to control the generation, storage, and maintenance of one or more certificate revocation lists (CRLs). Note that while a single certificate authority system 116 is illustrated, various embodiments may utilize a chain or hierarchy of certificate authorities and associated certificate authority systems. In some embodiments, even if multiple certificate authorities are utilized, a single CRL may be utilized for certificates chaining up to the same certificate authority. By utilizing a single CRL in some embodiments, the system may be configured to simplify management of the CRL. While a single CRL 124 is presented in the illustrated embodiment, in various other embodiments multiple CRLs may be utilized.

Certificate Revocation

In various embodiments, CRL 124 may include one or more records of revoked certificates. Each of such records may include but is not limited to one or more of an identifier (e.g., serial number or other identifier) of a revoked certificate, a revocation date which may be a date and/or time at which the certificate was revoked (or a date and/or time at which the certificate is believed to have become invalid or determined to have become invalid), an effective date of the revoked certificate (e.g., a date and/or time at which the certificate became valid), and/or an expiration date of the revoked certificate (e.g., a date and/or time at which the certificate was scheduled to become invalid or expected to become invalid). Note that while the aforesaid information is described as being stored in one or more records, other storage arrangements may be utilized in other embodiments.

The certificate authority system 116 may be configured to revoke (e.g., add to CRL 124 a certificate or an identifier of the certificate, such as serial number) a particular certificate in response to determining that the corresponding private key (e.g., the private key that forms a private key—public key pair with the public key of the certificate) has been compromised (e.g., obtained by an untrusted entity or system) or that the private key is believed to have been compromised. In some cases, certificate authority system 116 (or an entity controlling such system) may actively determine that a private key has been compromised. In other cases, other entities or systems may notify certificate authority system 116 that a private key has been compromised. In one example, signing entity system 100 may transmit a compromised private key and/or the certificate identifier of the corresponding certificate to certificate authority system 116 along with an instruction to revoke the certificate that corresponds to that private key. For instance, signing entity system 100 may transmit such information to certificate authority system 116 in response to obtaining information that indicates a particular private key has been obtained by an untrusted entity or system or that the private key is believed to be (but not necessarily known to be) compromised.

In contrast to conventional systems that discard a given record of a revoked certificate from the CRL after the expiration date of the certificate corresponding to that record, certificate authority system 116 may in various embodiments store (or "maintain" or "persist") one or more records of revoked certificates within CRL 124 even after the expiration dates of the certificates corresponding to such records have passed. As described in more detail below with respect to the configuration of verifying entity system 124, creating and maintaining CRL 124 in this manner may facilitate successful long-term verification of digital signatures. In some embodiments, performing a long-term verification of a digital signature may include performing a verification of the signature with the certificate that was valid at the time at which the digital signature was generated subsequent to the expiration date (and/or time) of that certificate. In contrast to conventional systems that require data to be resigned one or more times after the expiration date of the certificate that was valid at the time at which the original digital signature was generated, the illustrated system may be configured to verify a particular digital signature after the expiration date of the corresponding certificate (e.g., the certificate that contains the public key corresponding to the private key used to create the particular digital signature). Accordingly, in various embodiments, the illustrated system may not perform resigning of data each time a certificate expires and may instead verify data 106 based on the original (or first) digital signature 112. These techniques do not require data 106 to be resigned and may operate successfully without any resigning at all, according to various embodiments. By avoiding the resigning of data 106 (e.g., avoiding creating a new digital signatures each time a certificate expires), various embodiments may simplify the verification process and require less system resources for such verification. The digital signature verification process will be described in additional detail below with respect to the verifying entity system.

Verifying Entity

In various embodiments, verifying entity system 124 may be configured to verify a digital signature, as described in more detail below. In the illustrated embodiment, verifying entity system 124 may be configured to receive signed data 114, which is described in more detail above. The verifying entity system 124 may include a signature verification component 128 configured to verify the digital signature of signed data, such as signed data 114, and generate a verification result 130 that indicates whether digital signature 112 is valid. Note that since data 106 includes a timestamp 110 that indicates the time at which data 106 was signed, positively verifying the digital signature 112 may in some cases be equivalent to positively determining that signing entity system 100 (or an entity controlling such system, such as the illustrated user) electronically signed data 106 at that time. For instance, as described above, data 106 may represent a loan application (e.g., a mortgage) and a positive verification of the digital signature may be equivalent to positively determining that the illustrated user electronically signed the loan application (thereby agreeing to the terms set forth in data 106) at time 110, according to some embodiments.

Note that in some cases digital signature 112 may be referred to as a light weight digital signature since it does not contain a CRL. For instance, unlike conventional systems, the illustrated system may be configured to perform long-term digital signature verification for digital signatures that do not include CRLs. By utilizing digital signature that do not require inclusion of the CRL in the signature or the signed data, various embodiments may reduce the data footprint (e.g., the amount of memory required to store a copy of the signed data) of the signed data. Reducing the data footprint may in various embodiments reduce usage of network bandwidth and/or processing resources in the illustrated system. In various embodiments, the signature verification component 128 may be configured to obtain CRL 124 from certificate authority system 116. Since CRL 124 may be updated (e.g., additional revocation records may be added to the list) at various points in time, signature verification component 128 may be configured to check certification authority system 116 for updates at one or more instances in time. In some cases, such updates may be delivered as an entirely new copy of the CRL. In other cases, such updates may be delivered in a "delta" manner. For example, in a delta configuration, only changes to the CRL are provided to the signature verification component 128, which may be responsible for reconciling such changes with previous stored versions of the CRL in order to generate an up-to-date version of the complete CRL. In various embodiments, signature verification component may be configured to store one or more copies of CRL 124 within CRL cache 126, which may be implemented via any of a variety of data stores. In various embodiments, signature verification component 128 may be configured to determine the current version (e.g., based on a publishing time of the CRL) of the CRL within cache 126 and update the CRL in the cache to a newer version in response to determining that CRL 124 is newer (e.g., based on a publishing time of CRL 124) than the CRL stored in cache 126.

In addition to signed data 114, verifying entity system 124 may receive additional information (not illustrated) from signing entity system 100 with respect to the verification of digital signature 112. For instance, in one embodiment, signing entity system 100 may provide verifying entity system 124 with an identifier of the certificate to be utilized for verifying the digital signature of signed data 114. For example, signature verification component 128 may be configured to query certificate authority system 116 with a request for a particular certificate. Such request may include the certificate identifier provided by the signing entity system. In response to the query, the certificate authority system may be configured to provide the particular certificate that corresponds to the certificate identifier of the request. In the illustrated embodiment, such certificate is illustrated as certificate 118n, which may be a particular one of the certificates 118. In some embodiments, certificate 118n may be digitally signed and/or encrypted such that verifying entity system 124 may verify that the certificate authority (e.g., a trusted third party) indicates the certificate is authentic. For instance, the certificate may be signed with or encrypted with the certificate authority's private key. In various other embodiments, the signature verification component 128 may be configured to obtain certificate 118n from sources other than certificate authority system 116, such as from signing entity system 100 or from another system configured to provide such certificates.

Note that in some embodiments verifying entity system 124 may be configured to offload the verification of digital signatures to a trusted server (not illustrated). For example, verifying entity system 124 may be configured to submit a signature verification request for a particular digital signature to such a trusted server. The trusted server may be configured perform signature verification of the digital signature according to any of the techniques described herein. The trusted server may be configured to send a verification response to verifying entity system 124 to indicate the result of the verification. Examples of protocols that may be utilized in these embodiments include Online Certificate Status Protocol (OCSP) and Server-based Certificate Validation Protocol (SCVP).

Digital Signature Verification Component

Signature verification component 128 may be configured to perform verification of digital signature 112 according to various techniques, which are described in more detail below. As described above, signature verification component 128 may in some embodiments store a cache of one or more CRLs, as illustrated by CRL cache 126. As part of the signature verification process, signature verification component may be configured to determine whether cache 126 includes the most recent copy of CRL 124 with respect to the current time. For instance, as described above, the signature verification component may be configured to compare the publishing times associated with the most recent copy of CRL 124 stored in CRL cache 126 and the publishing time of CRL 124 stored in certificate authority system 116. In some cases, if the publishing time of the cached CRL is equal to the publishing time of CRL 124 stored in certificate authority system 116, the signature verification component may be configured to utilize the CRL currently cached in CRL cache 126 for the verification process. In some cases, if the publishing time of the cached CRL is a time prior to the publishing time of CRL 124 stored in certificate authority system 116, the signature verification component may be configured to update the CRL currently cached in CRL cache 126 to be equivalent to the most recent CRL 124 stored in certificate authority system 116 and utilize the updated cached CRL for the signature verification process.

In some cases, signature verification component may be configured to communicate with multiple certificate authority systems similar to or the same as certificate authority system 116. While certificate authority system 116 may be configured to store (or "maintain" or "persist") one or more records of revoked certificates within CRL 124 even after the expiration dates of the certificates corresponding to such records have passed, some other certificate authority systems to which verifying entity system 124 communicates may not necessarily provide such functionality. According to various embodiments, any given certificate authority system may be configured to indicate whether or not it stores records of revoked certificates within a CRL even after the expiration dates of the certificates corresponding to such records have passed.

In various embodiments, the signature verification process performed by signature verification component 128 may include verifying whether the certificate authority system stores records of revoked certificates within a CRL after the expiration dates of the certificates corresponding to such records have passed. If the certificate authority system provides such functionality, the signature verification component 128 may determine that the CRLs from that certificate authority system may be utilized for signature verification. If the certificate authority system does not provide such functionality, the signature verification component 128 may determine that the CRLs from that certificate authority system are not to be utilized for signature verification.

In some cases, signature verification component 128 may perform this check in order to ensure that CRLs from that certificate authority system are eligible to be used for long-term signature verification. For instance, in various embodiments, if a CRL does not include records of revoked certificates after the expiration dates of such certificates, the CRL cannot be relied on for long-term signature verification (e.g., signature verification that verifies a digital signature against a digital certificate after that certificate's expiration date). For example, consider the case including a certificate that is both expired (e.g., current time is later than the expiration time of that certificate) and revoked. In this example, if the CRL were to maintain the revocation statuses of certificates after their expiration dates, the CRL would include a record of the revocation status for the revoked certificate at the current time. Accordingly, if the signature verification component were to evaluate the CRL at the current time to determine the revocation status of the expired certificate, the signature verification component would determine an accurate revocation status (e.g., certificate revoked) even though the certificate is expired at the current time. On the other hand, if the CRL were not to maintain the revocation statuses of certificates after their expiration dates, the CRL may not include a record of the revocation status of the particular certificate at the current time. Accordingly, if the signature verification component were to rely on the CRL at the current time to verify a signature signed with the currently revoked certificate, the signature verification component might erroneously determine that revoked certificate is valid (e.g., not revoked). By ensuring that certificate authority system 116 maintains records of revocation statuses for expired certificates, verifying entity system 124 may ensure that it is using valid revocation status information when performing long-term digital signature verification.

In some cases, certificate authority system 116 may be configured to append metadata to CRLs that it manages in order to indicate whether that CRL maintains records for revoked certificates as described above. In various embodiments, signature verification component 128 may be configured to verify such metadata to confirm that the CRL maintains records for revoked certificates as described above. If the metadata does not indicate that the CRL maintains records for revoked certificates as described above, the signature verification component may determine that signature verification is not to be performed with that CRL.

In various embodiments, a given CRL (e.g., CRL 124) may include information indicating an effective date of the CRL (e.g., a date and/or time at which the CRL became valid and/or available), and/or an expiration date of the CRL (e.g., a date and/or time after which the CRL is no longer to be relied upon). In various embodiments, the signature verification component 128 may evaluate some or all of this information as part of the signature verification process. In some embodiments, signature verification component may be configured to determine that the expiration date of the CRL is a time that is later than the time at which the signature was created. For instance, the signature verification component may be configured to compare the expiration date of the CRL to timestamp 110. If the expiration date of the CRL is later than timestamp 110 (which may indicate when data 106 was digitally signed), the signature verification component may proceed with signature verification. If the timestamp 110 is later than the expiration date of the CRL, the signature verification component may not proceed with signature verification. In some embodiments, by ensuring that signature verification can only proceed if the expiration date of the CRL (e.g., CRL 124) is later than timestamp 110, the signature verification component 128 may protect the verifying entity system from attacks where older CRLs are fed to the verifying entity system. In some embodiments, the signature verification component 128 may be configured such that the effective date of the CRL (e.g., CRL 124) may have no bearing on whether the signature verification process proceeds. In various embodiments, there may be no security risk to the signature verification component ignoring the effective date of the CRL as long as the signature verification component ensures that the CRL maintains revocation statuses for expired certificates (as described above).

As part of the digital signature verification process, the digital signature verification component 128 may verify that the one or more certificates to be used to verify digital signature 112 are not revoked. In the illustrated embodiment, this verification may be performed for a single certificate 118*n*. Note that in various other embodiments, the techniques described herein may also be applied to multiple certificates, such as a chain of certificates (e.g., a chain of certificates that chain up to a root certificate authority such as a certificate authority controlling certificate authority system 116). Likewise, the techniques described herein are also applicable to embodiments that include multiple CRLs instead of a single CRL 124. To verify that certificate 118*n* has not been revoked, signature verification component may determine whether CRL 124 (which may be accessed from certificate authority system 116, CRL cache 126, or some other location) contains a record that indicates certificate 118n was revoked at the time of signing (e.g., as indicated by timestamp 110). In some cases, this lookup process may be performed by searching for a certificate identifier (e.g., a serial number) of the certificate within CRL 124. If signature verification component determines that no record of the certificate is present within the CRL, the signature verification component may proceed with verifying digital signature 112 as described below with respect to FIG. 3. If signature verification component 128 determines that a record of the certificate is present within the CRL, the signature verification may proceed to determine whether the record indicates the certificate as being revoked before or after the time at which the digital signature 112 was created (i.e., the time of signing) as indicated by timestamp 110. If the signature verification component determines that the certificate was revoked prior to the time at which the digital signature 112 was created, the digital signature verification component may determine that digital signature 112 is not valid. In this case, digital signature verification component 128 may generate verification result 130 such that the result indicates the digital signature is invalid. If the signature verification component determines that the certificate was revoked after the time at which the digital signature 112 was created, the digital signature verification component may proceed with verifying digital signature 112 as described below with respect to FIG. 3.

Figure 3:
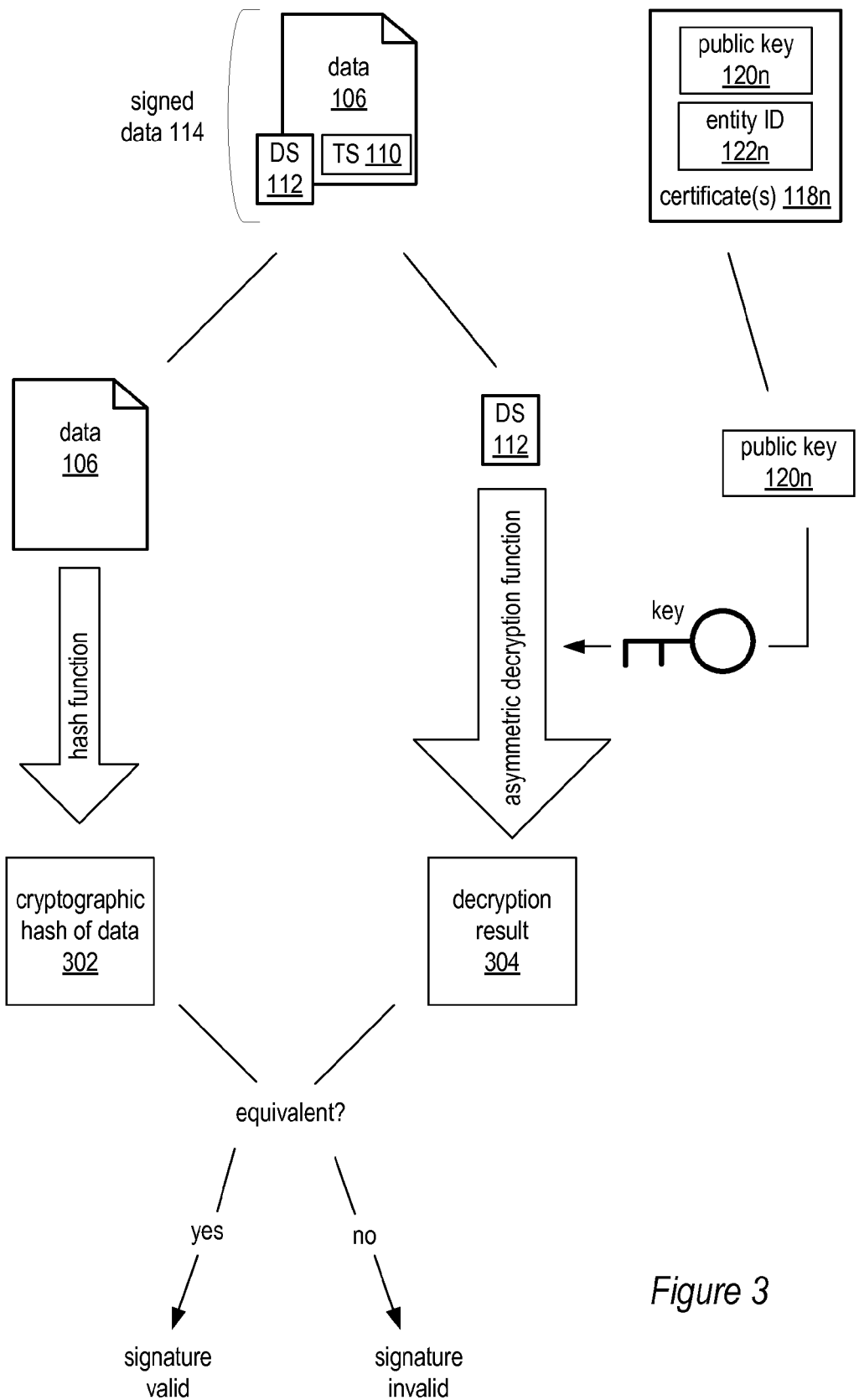
FIG. 3 illustrates a data flow diagram of a process for verifying digitally signed data, according to various embodiments.

The process for verifying digital signature 112 may include verifying the digital signature against the certificate 118n (or chain of certificates, if applicable). FIG. 3 illustrates a flow diagram for one portion of the digital signature verification process described herein. As illustrated by FIG. 3, the signature verification component 128 may begin this portion of the process of verifying the digital signature by parsing the digitally signed data 114 into data 106 and digital signature 112. (In some cases, data 106 and digital signature 112 may already be separate and parsing may not be necessary.) The signature verification component may perform a hash function (e.g., SHA-1) on data 106, the result of which is illustrated by cryptographic hash of license 402. In various embodiments, the signature verification component utilizes the same hash function as utilized by the signature generation component as described above in regard to FIG. 2. The signature verification component may also be configured to perform an asymmetrical decryption function on digital signature 112 by decrypting the digital signature 112 with a public key 112n. In various embodiments, public key 112n may be the public key that corresponds to private key 102 described above with respect to FIGS. 1 and 2 (e.g., the private key 102 and public key 120n may be generated as a key pair by a key derivation function). In various embodiments, public key 120n may be obtained by the signature verification component 128 from digital certificate 118n, such as the digital certificates described above (e.g., an X.509 certificate in PKI). In various embodiments, the asymmetric decryption function performed by the signature verification component 128 may correspond to (and/or be the same as) the asymmetric encryption function performed by the signature generation component as described above with respect to FIG. 2. The signature verification component 128 may be configured to compare hash 302 with the result of the decryption function (illustrated as decryption result 304) to determine whether hash 302 and decryption result 304 are equivalent to each other (e.g., determine whether they are bit-wise equivalents). As illustrated, if signature verification component 128 determines that hash 302 and decryption result 304 are equivalent to each other, signature verification component 128 may determine that the digital signature is valid. As illustrated, if signature verification component 128 determines that hash 302 and decryption result 304 are not equivalent to each other, signature verification component 128 may determine that the digital signature is invalid. In various embodiments, signature verification component 128 may generate verification result 130 such that it indicates the result of the above-described techniques (i.e., whether the digital signature 112 is valid or invalid). In various embodiments, signature verification component may generate the verification result on a display (e.g., display 680 described below), such as to provide a visual or graphical indication of the result to one or more parties. In some embodiments, the signature verification may generate a report indicating the verification result. In some embodiments, the signature verification component may generate a message (e.g., an electronic mail message or some other type of message) and send such message to one or more relevant parties. In some embodiments, signature verification component may be configured to provide access to the signed data in response to generating a verification result that indicates the signature is valid. In some embodiments, signature verification component may be configured to withhold access to the signed data in response to generating a result that indicated the signature is invalid.

Unlike conventional systems, various embodiments of the system and method for long-term digital signature verification utilizing light weight digital signatures may support certificate revocation backdating as well as the utilization of such backdated certificates for digital signature verification. In some embodiments, for a private key that was compromised at a particular time, the certificate authority may obtain, at some time later than the particular time, information that indicates the private key was compromised at that particular time. In various embodiments, the certificate authority system 116 may be configured to generate CRL 124 such that the CRL includes a revocation record for the certificate corresponding to the revoked private key. In various embodiments, instead of creating the revocation date (described above) of the revocation record as the time at which the certificate authority was notified of the compromised private key, the certificate authority system 116 may generate the revocation record such that the record indicates the actual time at which private key was compromised (or believed to be compromised). The above-described technique may in various embodiments be referred to as CRL back-dating. Some conventional systems that rely on CRL information embedded within signed data may not be able to support CRL backdating (since such embedded CRL information may remain unchanged from the time of signing to the time of verification, in conventional systems) and thus may erroneously validate digital signatures that are signed with compromised private keys. In various embodiments, the signature verification component described herein may be configured to support CRL backdating by utilizing one or more backdated CRLs to perform signature verification (according to the techniques described herein).

Example Methods

Figure 4:
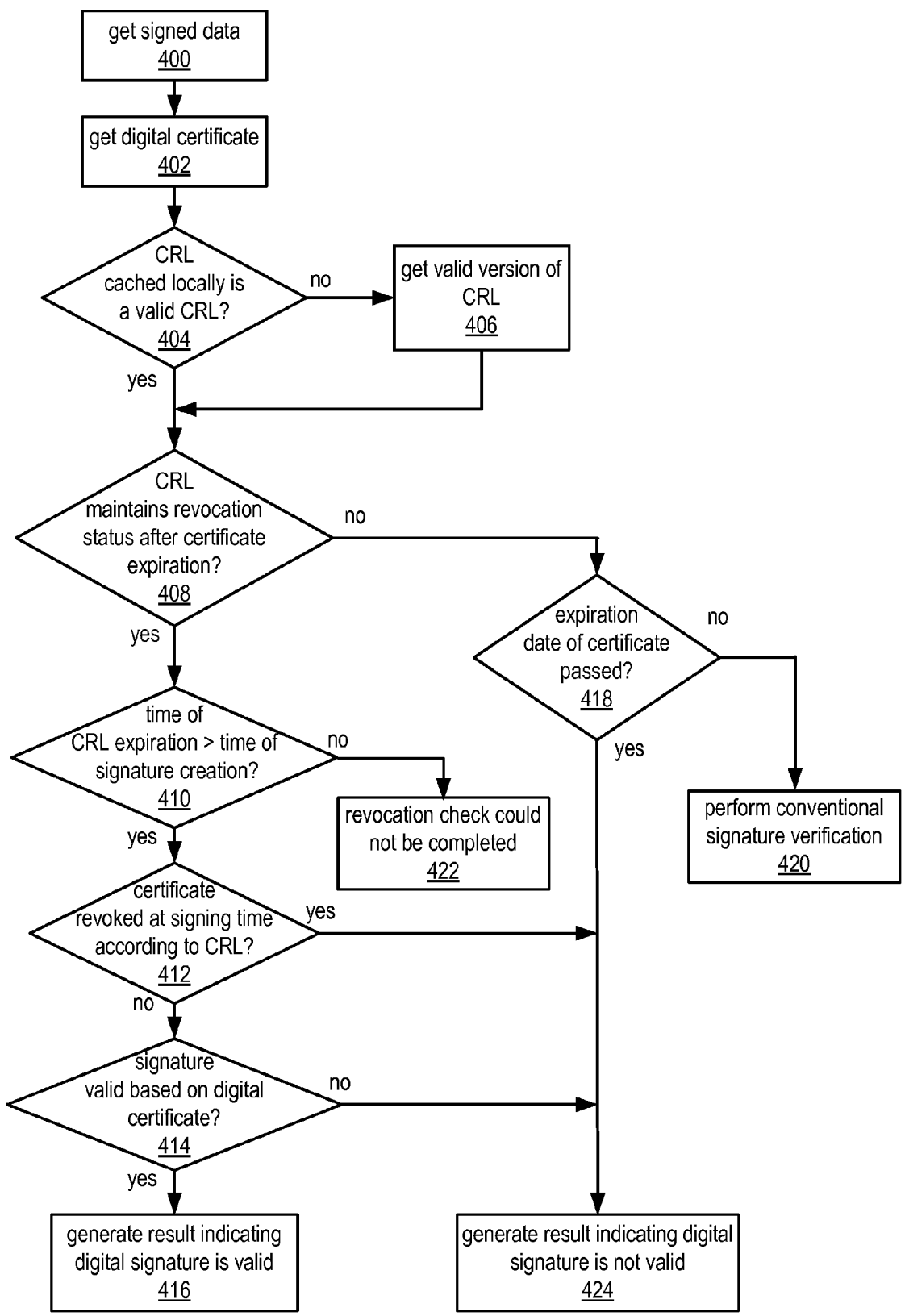
FIG. 4 illustrates a flowchart of an exemplary method that may be implemented by a digital signature verification component, according to various embodiments.

Various embodiments may include one or more methods for performing long-term verification of digital signatures utilizing lightweight digital signatures. One particular example of such a method is illustrated by the flowchart of FIG. 4. Note that in some embodiments signature verification component 128 may be configured to perform any of the methods described herein (including the illustrated method of FIG. 4). Note that in various embodiments, various blocks of the method may be omitted or arranged to be performed in a different order. In some cases, additional blocks may be added to the method to perform features of various embodiments not illustrated.

As illustrated by block 400, the method may include obtaining signed data, such as signed data 114 described above. As illustrated by block 402, the method may also include obtaining a corresponding digital certificate, such as digital certificate 118n described above. For instance, the method may include querying a certificate authority (e.g., with a certificate identifier) for a particular certificate and receiving the corresponding certificate in response to such query.

As illustrated by block 404, various embodiments may include determining whether a locally cached CRL is valid. In various embodiments, this may include determining whether the CRL is expired with respect to the current time. For example, the method may include comparing the current date (and/or time) with the expiration date (and/or time) of the CRL to determine whether the CRL is expired. If the CRL has expired, the method may include determining that the CRL is invalid and a new CRL may be fetched, as illustrated by block 406. If the CRL is not expired, the method may include determining that the CRL is valid and the method may proceed to block 408.

As described above, while some certificate authority systems may be configured to store (or "maintain" or "persist") one or more records of revoked certificates within CRLs even after the expiration dates of the certificates corresponding to such records have passed, some other certificate authority systems may not necessarily provide such functionality. According to various embodiments, any given certificate authority system may be configured to indicate whether or not it stores records of revoked certificates within a CRL even after the expiration dates of the certificates corresponding to such records have passed. As illustrated by block 408, the method may include determining whether the CRL stores records of revoked certificates within after the expiration dates of the certificates corresponding to such records have passed. If the CRL is configured in this manner, the method may determine that the CRL may be utilized for signature verification, as illustrated by the positive output of block 408. If the CRL does not maintain revocation statuses after the expiration of revoked certificates, the method may include determining whether the expiration date of the digital certificate has passed (block 418). If the expiration date has not passed (block 420), the method may proceed with a conventional signature verification process (such as that utilized by PKI). If the expiration date of the digital signature has passed, the method may include indicating the digital signature is not valid (block 424).

In some cases, the method may perform this check in order to ensure that CRLs are eligible to be used for long-term signature verification. For instance, in various embodiments, if a CRL does not include records of revoked certificates after the expiration dates of such certificates, the CRL cannot be relied on for long-term signature verification (e.g., signature verification that verifies a digital signature against a digital certificate after that certificate's expiration date), as described above with respect to FIGS. 1-3.

In some cases, CRLs may include metadata that indicates whether that CRL maintains records for revoked certificates as described above. In various embodiments, the method may include verifying such metadata to confirm that the CRL maintains records for revoked certificates. If the metadata does not indicate that the CRL maintains records for revoked certificates as described above, the method may proceed to block 418 as described above.

In various embodiments, a given CRL may include information indicating an effective date of the CRL (e.g., a date and/or time at which the CRL became valid and/or available), and/or an expiration date of the CRL (e.g., a date and/or time after which the CRL is no longer to be relied upon). The method may in various embodiments include evaluating some or all of this information as part of the signature verification process. As illustrated by block 410, the method may in various embodiments include determining that the expiration date of the CRL is a time that is later than the time at which the signature was created. For instance, the method may include comparing the expiration date of the CRL to a timestamp of the signed data that indicates the time at which the signature was created (e.g., timestamp 110, described above). If the expiration date of the CRL is later than the time at which the digital signature was created, the method may include proceeding with signature verification (as illustrated by the positive output of block 410). If the time at which the digital signature was created is later than the expiration date of the CRL, the method may include indicating that the revocation check could not be completed (as illustrated by block 422). In some embodiments, by ensuring that signature verification can only proceed if the expiration date of the CRL is later than the time at which the digital signature was created, the illustrated method may provide protection from attacks where older CRLs are fed to a verifying entity.

As part of the digital signature verification process, the method may include verifying that the one or more certificates to be used to verify the digital signature were not revoked at the signing time (e.g., the time that the signature was created) (as illustrated by block 412). In the illustrated embodiment, the method may include performing this portion of the method for a single certificate. Note that in various other embodiments, the techniques described herein may also be applied to multiple certificates, such as a chain of certificates (e.g., a chain of certificates that chain up to a root certificate authority). Likewise, the techniques described here are also applicable to embodiments that include multiple CRLs instead of a single CRL. To verify that certificate has not been revoked, the method may include determining whether the CRL contains a record that indicates the obtained certificate was revoked at the time of signing (e.g., as indicated by a timestamp of the signed data). In some cases, the method may include performing this lookup process by searching for a certificate identifier (e.g., a serial number) of the certificate within the CRL. If it is determined that no record of the certificate is present within the CRL, the method may proceed with the verification process, as illustrated by the negative output of block 412. If it is determined that a record of the certificate is present within the CRL, the method may include determining whether the record indicates the certificate as being revoked before or after the time at which the digital signature was created (i.e., the time of signing, such as indicated by the timestamp of the signed data). If it is determined that the certificate was revoked prior to the time at which the digital signature was created, the method may include determining that digital signature is not valid (e.g., positive output of block 412). If it is determined that that the certificate was revoked after the time at which the digital signature was created, the method may proceed with the verification process, as illustrated the negative output of block 412.

The illustrated method may include verifying the digital signature against the obtained digital certificate. As illustrated by block 414, in various embodiments, various different techniques for verifying a digital signature with respect to a digital certificate may be performed. One example of such a technique is described above with respect to FIG. 3. In various embodiments, the method described herein may include performing any technique in order to implement one or more portions of the verification process described above with respect to FIG. 3. If it is determined that the digital signature is valid based on the digital certificate (e.g., positive output of block 414), the method may include generating a result that indicate the digital signature is valid (e.g., block 416). If it is determined that the digital signature is not valid based on the digital certificate (e.g., negative output of block 414), the method may include generating a result that indicate the digital signature is invalid (e.g., block 424). In various embodiments, the method may include generating the verification result (e.g., blocks 416 or 424) on a display (e.g., display 680 described below), such as to provide a visual or graphical indication of the result to one or more parties. In some embodiments, the method may include generating a report indicating the verification result. In some embodiments, the method may include generating a message (e.g., an electronic mail message or some other type of message) and sending such message to one or more relevant parties. In some embodiments, the method may include providing access to the signed data in response to generating a verification result that indicates the signature is valid. In some embodiments, the method may include withholding access to the signed data in response to generating a result that indicated the signature is invalid.

Note that in various embodiments, validating the digital signature (e.g., blocks 412, 414 and 416) may be performed for long-term signature verification as described above. For instance, via the techniques described herein, the digital signature of the signed data may be validated with the digital certificate that was valid at the time the digital signature was generated (e.g., the certificate that includes the public key corresponding to the private key used to create the digital signature) even after the expiration date (and/or time) of that digital certificate (e.g., the certificate obtained in block 402). For instance, by utilizing a CRL that persists revocation information (e.g., information indicating whether a given digital certificate is revoked) for digital certificates that have already expired (in some cases, all digital certificates that have expired), the information in the CRL may be trusted when validating digital signatures with digital certificates that have already expired (since, in contrast to conventional CRLs, the CRL of various embodiments will maintain revocation information for such digital certificates).

Example System Configuration

Figure 5:
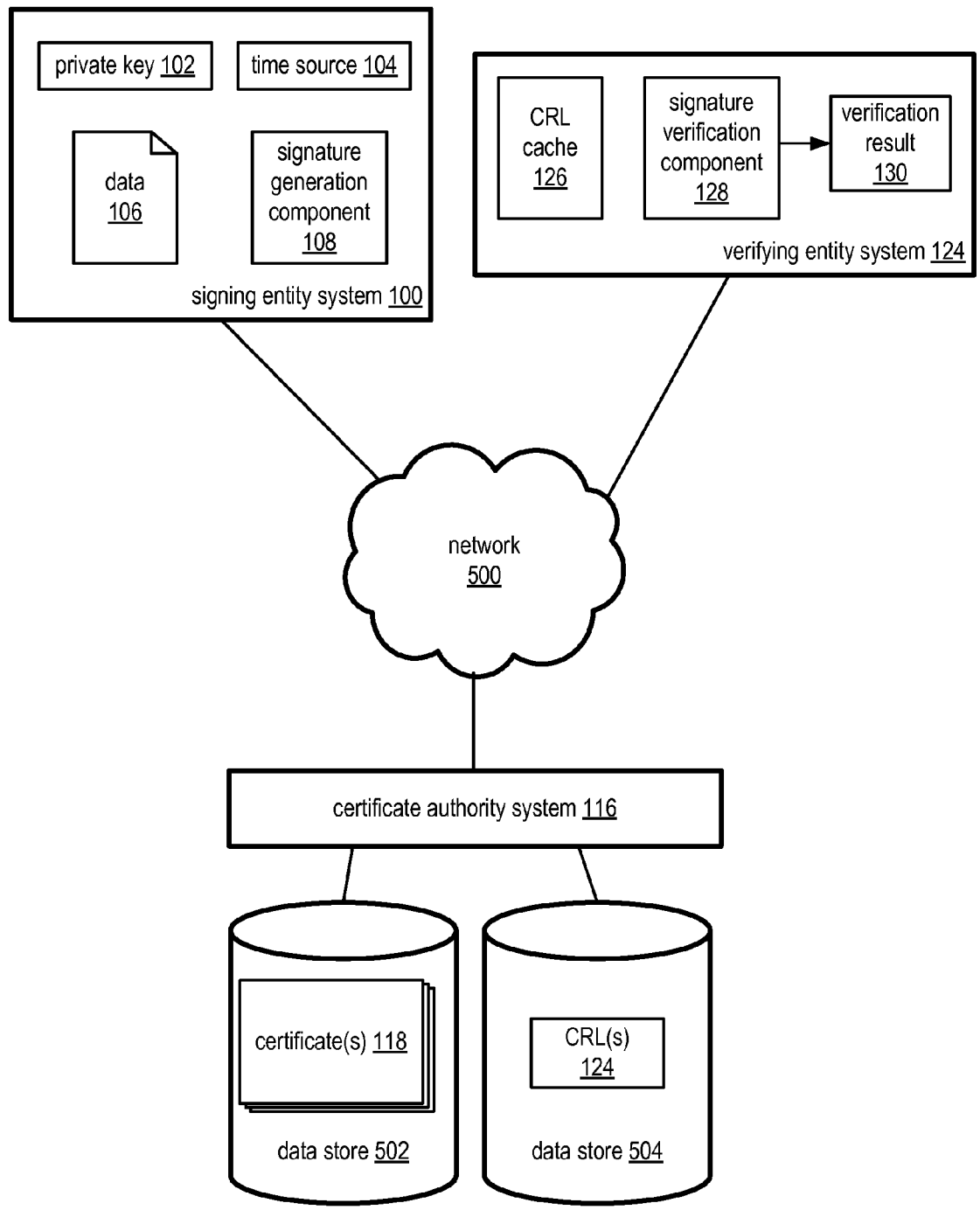
FIG. 5 illustrates a block diagram of one example of a system configuration, according to various embodiments.

FIG. 5 illustrates an example system configuration according to some embodiments. In the illustrated embodiments, each of signing entity system 100, verifying entity system 124 and certificate authority system 116 may be implemented via one or more computer systems, such as the computer system of FIG. 6 (described below). Furthermore, certificate(s) 118 and CRL(s) may be stored in data stores 502 and 504, which are accessible to certificate authority system 116. Such data stores may be configured as a database, as one or more mass storage devices (e.g., physical disks, logical volumes, etc.) configured to store data blocks or files, or in any other suitable configuration for data storage. Each of the illustrated elements may communicate with one another via network 500, which may include one or more Local Area Networks (LANs) (e.g., corporate or Ethernet networks), Wide Area Networks (WANs) (e.g., the Internet), some other network configured to transport electronic data, or some combination thereof.

Example Computer System

Various embodiments of a system and method for long-term digital signature verification utilizing light weight digital signatures, as described herein, may be executed on one or more computer systems, which may interact with various other devices. One such computer system is computer system 600 illustrated by FIG. 6, which may in various embodiments implement any of the elements illustrated in FIGS. 1-5. Computer system 600 may be capable of implementing a signature verification component, such as signature verification component 128, which may be stored in memory as processor-executable program instructions. In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In some embodiments, it is contemplated that embodiments may be implemented using a single instance of computer system 600, while in other embodiments multiple such systems, or multiple nodes making up computer system 600, may be configured to host different portions or instances of various embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x66, PowerPC, SPARC, or MIPS ISAs, or any other suitable ISA. In multiprocessor systems, each of processors 610 may commonly, but not necessarily, implement the same ISA.

System memory 620 may be configured to store program instructions 622 and/or data 632 accessible by processor 610. In various embodiments, data 632 may include a CRL cache and a verification result, such as CRL cache 126 and verification result 130 described above. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing a signature verification component 128 (as described above), are shown stored within system memory 620 as signature verification component 128. In other embodiments, program instructions and/or data may be received, sent or stored upon different types of computer-accessible media or on similar media separate from system memory 620 or computer system 600. Generally speaking, a computer-accessible medium may include storage media or memory media such as magnetic or optical media, e.g., disk or CD/DVD-ROM coupled to computer system 600 via I/O interface 630. Program instructions and data stored via a computer-accessible medium may be transmitted by transmission media or signals such as electrical, electromagnetic, or digital signals, which may be conveyed via a communication medium such as a network (e.g., network 760) and/or a wireless link, such as may be implemented via network interface 640.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 500), such as other computer systems, or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

Figure 6:
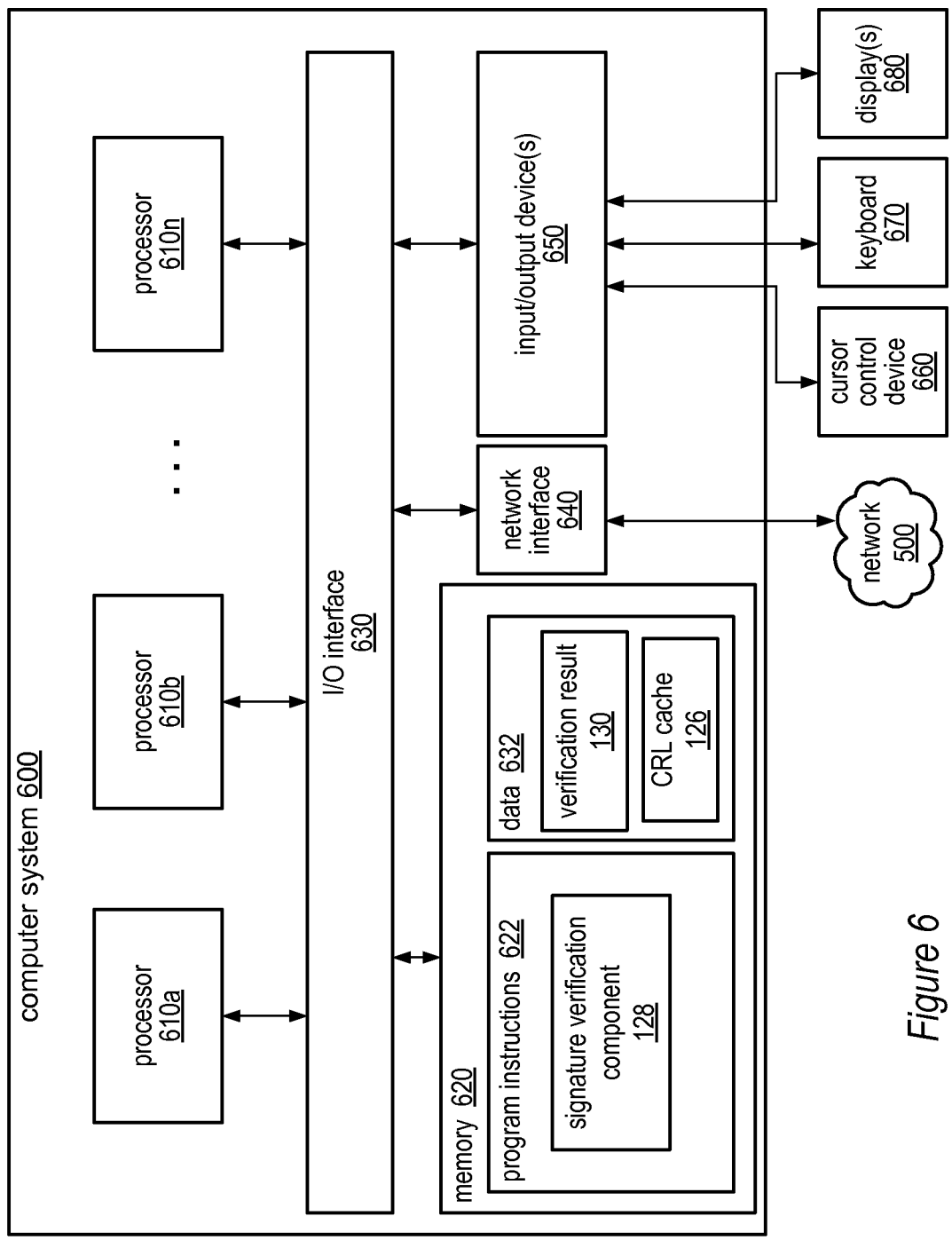
FIG. 6 illustrates an example computer system configured to implement various elements of the system and method for long-term digital signature verification utilizing light weight digital signatures, according to various embodiments.

As shown in FIG. 6, memory 620 may include program instructions 622 configured to implement a signature verification component 128. In one embodiment, signature verification component 128 may implement the methods described above, such as the method illustrated by FIG. 4. In other embodiments, different elements and data may be included.

Those skilled in the art will appreciate that computer system 600 is merely illustrative and is not intended to limit the scope of the present invention. In particular, the computer system and devices may include any combination of hardware or software that can perform the indicated functions, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include a storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of methods may be changed, and various elements may be added, reordered, combined, omitted, modified, etc. Various modifications and changes may be made as would be obvious to a person skilled in the art having the benefit of this disclosure. Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of the invention as defined in the claims that follow.

What is claimed is:

1. A computer-implemented method, comprising:
receiving, by a computing device, a digital signature of data and of a signing time of the digital signature;
receiving, by the computing device, a first digital certificate comprising information for verifying the digital signature, wherein the first digital certificate has an expiration time;
receiving, by the computing device, a current certificate revocation list (CRL) issued by a certificate authority after expiration of the first digital certificate, the CRL comprising revocation information for a plurality of revoked digital certificates including expired digital certificates, wherein the revocation information is up to date as of the time of issuance by the certificate authority, wherein at the time of issuance by the certificate authority the revocation information of the CRL indicates whether the expired first digital certificate has been revoked and indicates a revocation time if the expired digital certificate has been revoked; and subsequent to the expiration time of the first digital certificate, determining, by the computing device, that said digital signature is valid, wherein said determining comprises evaluating the CRL to determine that the first digital certificate was not revoked at said signing time.

2. The computer-implemented method of claim 1, wherein the received CRL is not included within the digitally signed data.

3. The computer-implemented method of claim 1, wherein evaluating the CRL to determine that the first certificate was not revoked at said signing time comprises determining that revocation information corresponding to the first digital certificate is not present within the CRL.

4. The computer-implemented method of claim 1, wherein evaluating the CRL to determine that the first certificate was not revoked at said signing time comprises:
   determining that a particular portion of the revocation information of the CRL corresponds to the first digital certificate, wherein said particular portion of the revocation information indicates a time at which the first digital certificate was revoked; and
   determining that the time at which the first digital certificate was revoked is later than the signing time of the digitally signed data.

5. The computer-implemented method of claim 1, wherein said determining that said digital signature is valid comprises determining that said digital signature is a valid digital signature of the data according to a public key stored within the digital certificate.

6. The computer-implemented method of claim 1, further comprising:
   receiving additional digitally signed data comprising: second data, a second signing time at which the second data was digitally signed, and a second digital signature of the second data and the second signing time;
   subsequent to the expiration time of the first digital certificate, determining that said second digital signature is invalid, wherein that determination comprises evaluating the CRL to determine that the first certificate was revoked prior to said signing time.

7. The computer-implemented method of claim 1, wherein said CRL is received separately from said digitally signed data via one or more data networks.

8. The computer-implemented method of claim 1, wherein the CRL is updated with one or more portions of new revocation information subsequent to the generation of said digital signature, wherein receiving the CRL comprises receiving a version of the CRL that includes the one or more portions of new revocation information.

9. The computer-implemented method of claim 1, further comprising, prior to using the CRL to determine a revocation status of the first digital certificate, verifying that the received CRL persists revocation information for digital certificates that have already expired.

10. The computer-implemented method of claim 1, further comprising, in response to determining that said digital signature is valid, generating a result indicating that said digital signature is valid on a display to provide a graphical indication of the result.

11. A system, comprising:
   a memory; and
   one or more processors coupled to the memory, wherein the memory comprises program instructions executable by the one or more processors to:
      receive a digital signature of data and of a signing time of the digital signature;
      receive a first digital certificate comprising information for verifying the digital signature, wherein the first digital certificate has an expiration time;
      receive a current certificate revocation list (CRL) issued by a certificate authority after expiration of the first digital certificate, the CRL comprising revocation information for a plurality of revoked digital certificates including expired digital certificates, wherein the revocation information is up to date as of the time of issuance by the certificate authority; wherein at the time of issuance by the certificate authority the revocation information of the CRL indicates whether the expired first digital certificate has been revoked and indicates a revocation time if the expired digital certificate has been revoked; and
      subsequent to the expiration time of the first digital certificate, determine that said digital signature is valid, wherein said determining comprises evaluating the CRL to determine that the first digital certificate was not revoked at said signing time.

12. The system of claim 11, wherein the received CRL is not included within the digitally signed data.

13. The system of claim 11, wherein to evaluate the CRL to determine that the first certificate was not revoked at said signing time, the program instructions are configured to determine that revocation information corresponding to the first digital certificate is not present within the CRL.

14. The system of claim 11, wherein to evaluate the CRL to determine that the first certificate was not revoked at said signing time, the program instructions are configured to:
   determine that a particular portion of the revocation information of the CRL corresponds to the first digital certificate, wherein said particular portion of the revocation information indicates a time at which the first digital certificate was revoked; and
   determine that the time at which the first digital certificate was revoked is later than the signing time of the digitally signed data.

15. The system of claim 11, wherein to determine that said digital signature is valid, the program instructions are configured to determine that said digital signature is a valid digital signature of the data according to a public key stored within the digital certificate.

16. The system of claim 11, wherein the program instructions are configured to:
   receive additional digitally signed data comprising: second data, a second signing time at which the second data was digitally signed, and a second digital signature of the second data and the second signing time;
   subsequent to the expiration time of the first digital certificate, determine that said second digital signature is invalid, wherein that determination comprises evaluating the CRL to determine that the first certificate was revoked prior to said signing time.

17. The system of claim 11, wherein said CRL is received separately from said digitally signed data via one or more data networks.

18. The system of claim 11, wherein the CRL is updated with one or more portions of new revocation information subsequent to the generation of said digital signature, wherein to receive the CRL the program instructions are configured to receive a version of the CRL that includes the one or more portions of new revocation information.

19. The system of claim 11, wherein the program instructions are configured to, prior to using the CRL to determine a revocation status of the first digital certificate, verify that the received CRL persists revocation information for digital certificates that have already expired.

20. The system of claim 11, wherein the program instructions are configured to generate a result on a display to provide a graphical indication that said digital signature is valid in response to determining that said digital signature is valid.

21. A non-transitory computer-readable storage medium, storing program instructions computer-executable to:
receive a digital signature of data and of a signing time of the digital signature;
receive a first digital certificate comprising information for verifying the digital signature, wherein the first digital certificate has an expiration time;
receive a current certificate revocation list (CRL) issued by a certificate authority after expiration of the first digital certificate, the CRL comprising revocation information for a plurality of revoked digital certificates including expired digital certificates, wherein the revocation information is up to date as of the time of issuance by the certificate authority, wherein at the time of issuance by the certificate authority the revocation information of the CRL indicates whether the expired first digital certificate has been revoked and indicates a revocation time if the expired digital certificate has been revoked; and
subsequent to the expiration time of the first digital certificate, determine that said digital signature is valid, wherein said determining comprises evaluating the CRL to determine that the first digital certificate was not revoked at said signing time.

22. The medium of claim 21, wherein the received CRL is not included within the digitally signed data.

23. The medium of claim 21, wherein to evaluate the CRL to determine that the first certificate was not revoked at said signing time, the program instructions are configured to determine that revocation information corresponding to the first digital certificate is not present within the CRL.

24. The medium of claim 21, wherein to evaluate the CRL to determine that the first certificate was not revoked at said signing time, the program instructions are configured to:
determine that a particular portion of the revocation information of the CRL corresponds to the first digital certificate, wherein said particular portion of the revocation information indicates a time at which the first digital certificate was revoked; and
determine that the time at which the first digital certificate was revoked is later than the signing time of the digitally signed data.

25. The medium of claim 21, wherein to determine that said digital signature is valid, the program instructions are configured to determine that said digital signature is a valid digital signature of the data according to a public key stored within the digital certificate.

26. The medium of claim 21, wherein the program instructions are configured to:
receive additional digitally signed data comprising: second data, a second signing time at which the second data was digitally signed, and a second digital signature of the second data and the second signing time;
subsequent to the expiration time of the first digital certificate, determine that said second digital signature is invalid, wherein that determination comprises evaluating the CRL to determine that the first certificate was revoked prior to said signing time.

27. The medium of claim 21, wherein said CRL is received separately from said digitally signed data via one or more data networks.

28. The medium of claim 21, wherein the CRL is updated with one or more portions of new revocation information subsequent to the generation of said digital signature, wherein to receive the CRL the program instructions are configured to receive a version of the CRL that includes the one or more portions of new revocation information.

29. The medium of claim 21, wherein the program instructions are configured to, prior to using the CRL to determine a revocation status of the first digital certificate, verify that the received CRL persists revocation information for digital certificates that have already expired.

30. The medium of claim 21, wherein the program instructions are configured to generate a result on a display to provide a graphical indication that said digital signature is valid in response to determining that said digital signature is valid.

31. A computer-implemented method, comprising:
executing instructions on a specific apparatus so that binary digital electronic signals representing a digital signature of data and of a signing time of the digital signature are received;
executing instructions on said specific apparatus so that binary digital electronic signals representing a first digital certificate are received, wherein the first digital certificate comprises information for verifying the digital signature, wherein the first digital certificate has an expiration time;
executing instructions on said specific apparatus so that binary digital electronic signals representing a current certificate revocation list (CRL) issued by a certificate authority after expiration of the first digital certificate are received including revocation information for a plurality of revoked digital certificates including expired digital certificates, wherein the revocation information is up to date as of the time of issuance by the certificate authority, wherein at the time of issuance by the certificate authority the revocation information of the CRL indicates whether the expired first digital certificate has been revoked and indicates a revocation time if the expired digital certificate has been revoked; and
subsequent to the expiration time of the first digital certificate, executing instructions on said specific apparatus to determine that said digital signature is valid, wherein said determining comprises evaluating the CRL to determine that the first digital certificate was not revoked at said signing time.

* * * * *